US010171415B2

(12) United States Patent
Bhuiyan et al.

(10) Patent No.: US 10,171,415 B2
(45) Date of Patent: Jan. 1, 2019

(54) CHARACTERIZATION OF DOMAIN NAMES BASED ON CHANGES OF AUTHORITATIVE NAME SERVERS

(71) Applicant: VERISIGN, INC., Reston, VA (US)

(72) Inventors: Md Mansurul Alam Bhuiyan, West Lafayette, IN (US); Yannis Labrou, Washington, DC (US); Abedelaziz Mohaisen, Chantilly, VA (US)

(73) Assignee: VERISIGN, INC., Reston, VA (US)

( * ) Notice: Subject to any disclaimer, the term of this patent is extended or adjusted under 35 U.S.C. 154(b) by 417 days.

(21) Appl. No.: 14/510,655

(22) Filed: Oct. 9, 2014

(65) Prior Publication Data

US 2015/0106494 A1    Apr. 16, 2015

Related U.S. Application Data

(60) Provisional application No. 61/889,847, filed on Oct. 11, 2013.

(51) Int. Cl.
*G06F 15/173* (2006.01)
*H04L 29/12* (2006.01)
(Continued)

(52) U.S. Cl.
CPC .............. *H04L 61/15* (2013.01); *H04L 41/14* (2013.01); *H04L 61/302* (2013.01); *H04L 61/6004* (2013.01); *H04L 63/1441* (2013.01)

(58) Field of Classification Search
CPC ....... H04L 61/151; H04L 41/14; H04L 61/15; H04L 61/302; H04L 63/1441; H04L 61/6004
See application file for complete search history.

(56) References Cited

U.S. PATENT DOCUMENTS 8,516,585 B2    8/2013    Cao et al.
8,539,577 B1    9/2013    Stewart et al.
(Continued)

FOREIGN PATENT DOCUMENTS

WO    WO 2009155453 A1 * 12/2009    ....... H04L 29/12066

OTHER PUBLICATIONS

Mansurul Bhuiyan et al., "Characterization of the Dynamics and Interactions of Domain Names and Name Server", Communications and Network Security (CNS), IEEE Conference, 2013, pp. 1-2.
(Continued)

*Primary Examiner* — Moustafa M Meky
*Assistant Examiner* — Kidest Mendaye
(74) *Attorney, Agent, or Firm* — MH2 Technology Law Group, LLP (57) ABSTRACT

Embodiments relate to systems, devices, and computer-implemented methods for characterizing domain names by determining a name server switching footprint for domain names using a data set corresponding to name server operations for the domain names. The domain names can be clustered into groups based on the name server switching footprints, and intended uses of domain names in a group can be extrapolated to other domain names in the group. Name server switching footprints can also be predicted for new domains names using a prediction model trained using the determined name server switching footprints for the domain names in the data set.

19 Claims, 7 Drawing Sheets

(51) Int. Cl.
 H04L 12/24 (2006.01)
 H04L 29/06 (2006.01)

(56) References Cited

U.S. PATENT DOCUMENTS

| | | | |
|---|---|---|---|
| 8,549,479 B2 | 10/2013 | Chavvakula et al. | |
| 8,555,388 B1 | 10/2013 | Wang et al. | |
| 8,661,544 B2 | 2/2014 | Yen et al. | |
| 8,713,676 B2 | 4/2014 | Pandrangi et al. | |
| 2009/0043720 A1* | 2/2009 | Reznik | G06F 17/30861 706/20 |
| 2011/0283357 A1* | 11/2011 | Pandrangi | H04L 63/1416 726/22 |
| 2012/0084860 A1* | 4/2012 | Cao | H04L 63/1441 726/23 |
| 2013/0268675 A1* | 10/2013 | Tsai | H04L 61/1511 709/226 |
| 2015/0188883 A1* | 7/2015 | Xie | H04L 61/302 709/245 |

OTHER PUBLICATIONS

Shuang Hao et al., "An Internet-Wide View into DNS Lookup Patterns", VeriSign Corporation, http//www.verisigninc.com/assets/whitepaper-dns-lookup-patterns.pdf, 2010, pp. 1-6.
Tim Snoke, "Watching Domains that Change DNS Servers Frequently", CERT/CC Blog, http://www.cert.org/blogs/certcc/post.cfm?EntryID=149, Mar. 11, 2013, 1 page.
Yuanchen He et al., "Mining DNS for Malicious Domain Registrations", In Collaborative Computing: Networking, Applications and Worksharing (CollaborateCom), IEEE 6th International Conference, 2010, pp. 1-6.
Thorsten Holz, "Detection and Mitigation of Fast-Flux Service Networks", Proceedings of the 15th Annual Network and Distributed System Security Symposium (NDSS'08), 2008, pp. 1-42.
G. E. P. Box et al., "Time Series Analysis Forecasting and Control", 1970, Review by D. J. Bartholomew appearing in Operational Research Quarterly, vol. 22, No. 2, Jun. 1971, pp. 199-201.
Layth C. Alwan et al., "Time-Series Modeling for Statistical Process Control", Journal of Business and Economic Statistics, vol. 6, No. 1, Jan. 1988, pp. 87-95.
Susan Porter-Hudak, "An Application of the Seasonal Fractionally Differenced Model to the Monetary Aggregates", Journal of the American Statistical Association, vol. 85, No. 410, Jun. 1990, pp. 338-344.
R. H. Shumway et al., "Dynamic Linear Models with Switching", Journal of the American Statistical Association, vol. 86, No. 415, Sep. 1991, pp. 763-769.
Jean-Chrysostome Bolot et al., "Performance engineering of the World Wide Web: Application to dimensioning and cache design", Computer Networks and ISDN Systems, vol. 28, 1996, pp. 1397-1405.
Jouni Viinikka et al., "Processing intrusion detection alert aggregates with time series modeling", Information Fusion, vol. 10, Issue 4, Oct. 2009, pp. 1-19.
Joao B. D. Cabrera et al., "Proactive Detection of Distributed Denial of Service Attacks Using MIB Traffic Variables—A Feasibility Study", Integrated Network Management Proceedings, IEEE, 2001, pp. 609-622.
Haiquin Liu et al., "Real-Time Detection of Stealthy DDoS Attacks Using Time-Series Decomposition", IEEE ICC Proceedings, 2010, pp. 1-6.
Rene Mayrhofer et al., "Shake Well Before Use: Authentication Based on Accelerometer Data", Pervasive Computing, Lecture Notes in Computer Science, vol. 4480, 2007, pp. 144-161.
KJ Salchow, Jr., "Load Balancing 101: Nuts and Bolts", White Paper, F5 Networks, Inc., 2012, pp. 1-10.
Erik Nygren et al., "The Akamai Network: A Platform for High-Performance Internet Applications", ACM SIGOPS Operating Systems Review, vol. 44, Issue 3, Jul. 2010, pp. 2-19.
Mark Felegyhazi et al., "On the Potential of Proactive Domain Blacklisting", Proceedings in LEET, 2010, pp. 1-8.
Frederic Lardinois, "More than 250M Domain Names Have Now Been Registered, Almost Half are .Com and .Net", http://techcrunch.com/2013/04/08/internet-passes-250m-registered-top-level-domain-names/, Apr. 2013, pp. 1-2.
Robert H. Shumway et al., "Time Series Analysis and Its Applications, With R Examples", Springer Texts in Statistics, Third Edition, 2011, pp. 1-202.
Aziz Mohaisen et al., "AMAL: High-Fidelity, Behavior-based Automated Malware Analysis and Classification", Information Security Applications, Lecture Notes in Computer Science, 2015, pp. 107-121.
Dekand Lin, "An Information-Theoretic Definition of Similarity", Proceedings of ICML, 1998, pp. 296-304.
Yingbo Miao et al., "Document Clustering using Character N-grams: A Comparative Evaluation with Term-based and Word-based Clustering", Proceedings of CIKM, 2005, pp. 1-2.
Stefan Axelsson, "Intrusion Detection Systems: A Survey and Taxonomy", BTH, Tech. Rep., 2000, pp. 1-27.
Robin Sommer et al., "Outside the Closed World: On Using Machine Learning for Network Intrusion Detection", IEEE Symposium on Security and Privacy, May 2010, pp. 305-316.
Elliot Silver, "Monitoring Domain Name Changes", Retrieved from the internet: http://www.domaininvesting.com/monitoring-domain-name-changes/, Mar. 6, 2011, pp. 1-2.
Emanuele Passerini et al., "FluXOR: Detecting and Monitoring Fast-Flux Service Networks", DIMVA 2008, LNCS 5137, pp. 186-206.
Extended European Search Report dated Jul. 20, 2015, European application No. 14188552.5, pp. 1-8.

* cited by examiner

CHARACTERIZATION OF DOMAIN NAMES BASED ON CHANGES OF AUTHORITATIVE NAME SERVERS

CROSS-REFERENCE TO RELATED APPLICATIONS

This Application claims priority to U.S. Provisional Patent Application No. 61/889,847, titled "CHARACTERIZATION OF DOMAINS BASED ON CHANGES OF AUTHORITATIVE NAME SERVERS", filed on 11 Oct. 2013 hereby incorporated by reference.

TECHNICAL FIELD

The present disclosure relates to systems, devices, and methods for characterizing domain names based on changes of name servers.

BACKGROUND

As Internet usage grows exponentially, the demand for Internet-related services is also growing rapidly. As a result of the increased usage of the Internet, the demand for domain names is also growing rapidly. Consequently, demand for domain related services is also on the rise. Such domain related services can include domain name creation, domain name registration renewal, and the like. Typically, a website serves as a primary vehicle for establishing an online presence for a domain name. To meet this ever increasing demand for domain name related services, it is necessary that the entities that provide these services do so in an efficient and cost-effective manner.

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g., the "www" level in www.example.com.

The responsibility for operating each TLD, including maintaining a registry of the second-level domains within the TLD, is delegated to a particular organization, known as a domain name registry ("registry"). The registry is primarily responsible for answering queries for IP addresses associated with domains ("resolving"), typically through DNS servers that maintain such information in large databases, and for operating its top-level domain.

For most TLDs, in order to obtain a domain name, that domain name has to be registered with a registry through a domain name registrar, an entity authorized to register Internet domain names on behalf end-users. Alternatively, an end-user can register a domain name indirectly through one or more layers of resellers. A registry may receive registrations from hundreds of registrars.

A registrar usually has a dedicated service connection with the registries in order to access domain related services, e.g., domain name creation or renewal. Registrars typically use the Extensible Provisioning Protocol ("EPP") as a vehicle to communicate with the registries in order to register or renew domain names. EPP is a protocol designed for allocating objects within registries over the Internet. The EPP protocol is based on Extensible Markup Language ("XML"), which is a structured, text-based format. The underlying network transport is not fixed, although the currently specified method is over Transmission Control Protocol ("TCP").

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data, such as the IPv4 address for A records. Comments can be included by using a semi-colon. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows for users to be directed to a desired domain by a lookup process whereby the user enters the desired domain, and the DNS returns appropriate IP numbers. During the DNS resolution process, a request for a given domain name is routed from a resolver (e.g., a stub resolver) to an appropriate server (e.g., a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

It may be desirable to maintain multiple name servers for a domain name for many reasons, including fault tolerance, load balancing, and geographical load distribution. There exists a large number of domains that perform frequent name server switches, even across several service providers. This phenomenon of name server switching is not usually expected under normal circumstances because it demands interference with existing DNS services. Additionally, domain names that perform frequent name server switches tend to be associated with objectionable behavior.

Accordingly, there is a need for methods, systems, and computer readable media for characterizing domain names based on name server switches.

SUMMARY

The present disclosure relates generally to methods, systems, and computer readable media for providing these and other improvements to domain characterization technologies.

Implementations of the present teachings relate to methods, systems, and computer-readable storage media for characterizing domain names by determining a name server switching footprint for domain names using a data set corresponding to name server operations for the domain names. The domain names can be clustered into groups based on the name server switching footprints, and intended uses of domain names in a group can be extrapolated to other domain names in the group. Name server switching footprints can also be predicted for new domains names using a prediction model trained using the determined name server switching footprints for the domain names in the data set.

In some embodiments, domain names can be clustered based on matching name server switching footprints.

In further embodiments, domain names can be clustered by determining n-grams for each name server switching footprint and determining distances between domain names based on the n-grams. The domain names can be clustered based on the distances.

In some implementations, a distance threshold can be specified, and domain names may not be clustered together if the distance between them exceeds the specified threshold.

In some embodiments, domain names in a group may be blacklisted based on determining that the intended use of the domain names in the group is objectionable. The intended use of the domain names may be identified using, for example, content of a website associated with the domain names, WHOIS information associated with the domain names, or domain name information service information associated with the domain names.

In some implementations, predicted name server switching footprints can be used to identify a future intended uses of new domain names. Additionally, misuse of the new domain names can be prevented based on a determination that the future intended uses of the new domain names are objectionable.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description refers to the same or similar parts. While several example embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
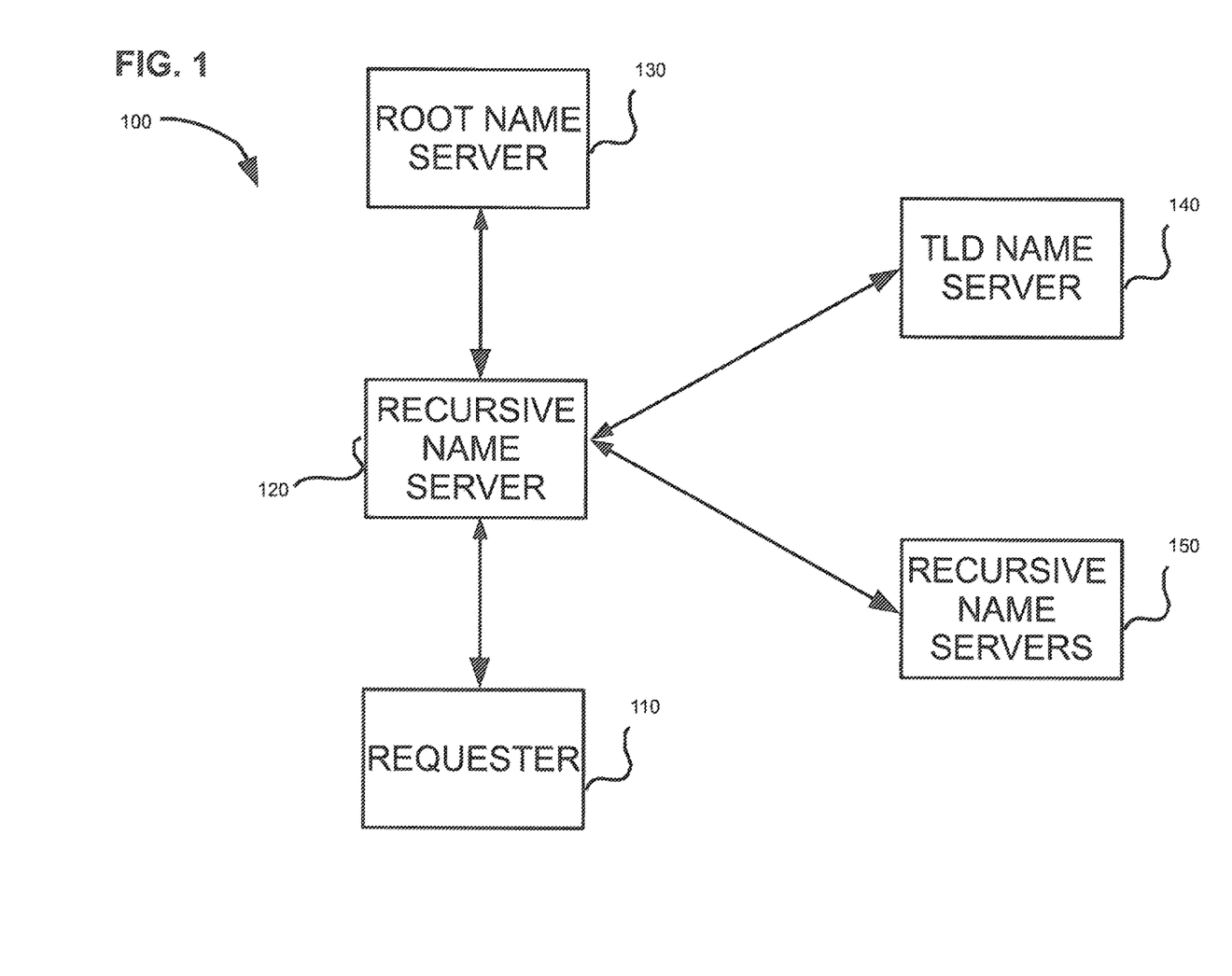
FIG. 1 is a diagram depicting an exemplary DNS schematic, consistent with certain disclosed embodiments.

FIG. 1 is a diagram depicting an exemplary DNS schematic, consistent with certain disclosed embodiments. In particular, FIG. 1 depicts a DNS 100. A client requester 110 can request an IP address associated with a domain name. The request can first go to the client's primary DNS server, which can be a recursive name server 120.

The recursive name server 120 may not be the authoritative name server for the requested domain name. Accordingly, the recursive name server can transfer the request to a root server 130. The root server 130 may respond by indicating the top-level domain ("TLD") name server 140 associated with the domain name. For example, the TLD of the domain can be .com, and the root server 130 may respond by indicating the TLD name server 140 is the TLD name server for .com.

The recursive name server 120 can then transfer the request to the TLD name server 140. The TLD name server 140 may have distributed the responsibility of assigning domain names and mapping those names to IP address by designating authoritative name servers for each zone of a TLD. Each zone of domain may include a subset of domain names in the TLD. In some cases, the same zone may be assigned to multiple name servers and the zones may overlap with included domain names. The recursive name server 120 can be one of the authoritative name servers, but not the authoritative name server for the zone that includes the requested domain name.

The TLD name server 140 can respond to the request by indicating that recursive name servers 150 are the authoritative name servers for the zone that includes the requested domain name. The recursive name server 120 can then transfer the request to one of the recursive name servers 150. The one of the recursive name servers 150 can respond to the request with the IP address corresponding to the domain name, the recursive name server 120 can transfer the IP address to the requester 110, and the requester 110 can access a web site of the domain name using the IP address.

For various domain names, name server switching may occur. The name server switching may be malicious in intent, for example, for the purpose of providing a hiding mechanism for the domain's intended uses. The name server switching may also be non-malicious. For example, the name server switching may be the result of reasonable behavior, such as normal hosting and operational changes. Additionally, for example, the name server switching may be the unintentional result of provider reassignment. The provider may reassign the domain for numerous reasons, including, for example, because the domain provides objectionable content. Examples of objectionable content can include illegal content, malware, pornography, unauthorized pharmaceutical drugs, link farms, etc.

The example depicted in FIG. 1 is merely for the purpose of illustration, and is not intended to be limiting. For example, additional root servers, name servers, and client requesters may be used as part of a DNS. Additionally, the DNS structure depicted and process described is merely a simplified example of a DNS and name server switching, consistent with certain disclosed embodiments, but such an example is not intended to be limiting.

Figure 2:
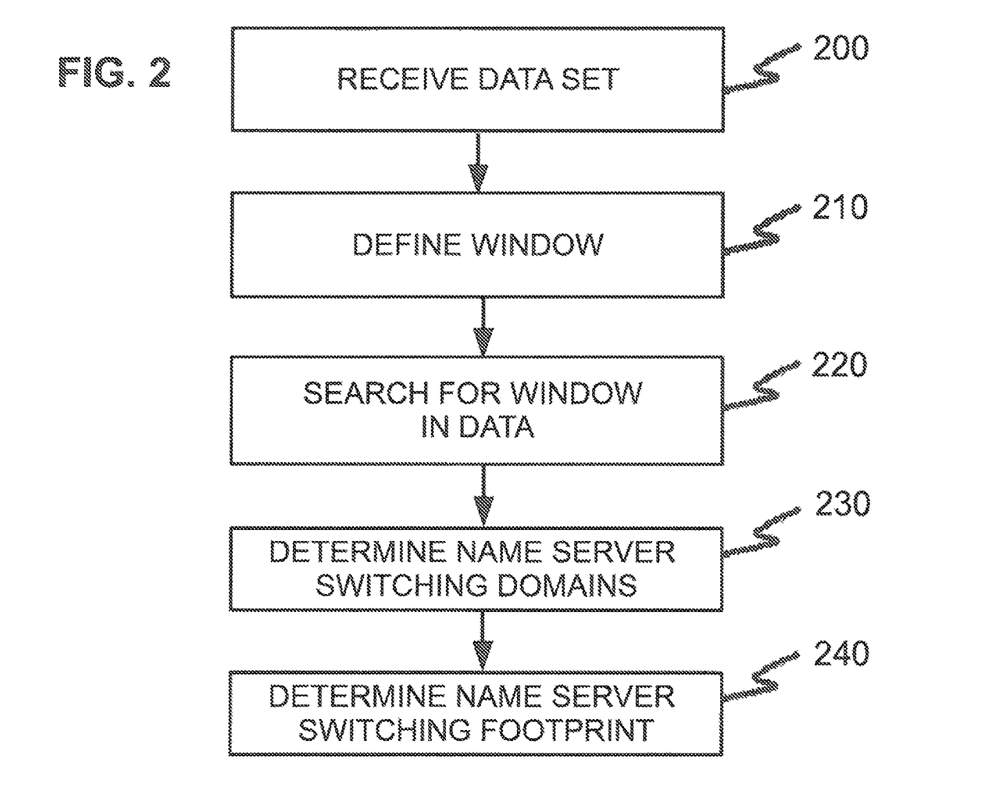
FIG. 2 is a flow diagram illustrating an example method of determining a name server switching footprint, consistent with certain disclosed embodiments.

FIG. 2 is a flow diagram illustrating an example method of determining a name server switching footprint, consistent with certain disclosed embodiments. The example method can begin in 200, when a computing device receives a data set related to domain name server operations. The data set can include chronologically ordered textual data indicating name server operations over a set time period.

For example, the computing device can receive the data set from a TLD name server and/or a domain name registry. In some embodiments, a domain name registry can create the data set based on rapid zone update files received from the recursive name servers. A rapid zone update file can be a text file that is sent at frequent intervals and includes information pertaining to changes in the zone since the previous rapid zone update file.

In some embodiments, the data set can be a Domain Name Zone Alerts ("DNZA") file or can be generated based on a DNZA file. A DNZA file may include information pertaining to all zone impacting transactions for one or more zones and/or one or more name servers. In some implementations, the DNZA can be created based on changes to an authoritative list of the name servers associated with each domain name. For example, the DNZA file may include chronologically ordered textual data representing each zone impacting transaction and associated domain name over a set period of time (e.g., 90 days). A zone impacting transaction can be name server operations, such as, for example, adding a name server to the authoritative list for a domain name, updating a name server in the authoritative list for a domain name, deleting a name server from the authoritative list for a domain name, etc. The DNZA file may be created by the registry using received rapid zone update files.

In 210, the computing device can define a window of events associated with name server switching. In various embodiments, a window can be a predetermined sequence or series of name server operations that can be indicative of name server switching. For example, in some embodiments, the window of events can be, for a single domain name, at least one add operation followed by at least one delete operation followed by at least one add operation. For example, the data set may include five name server transactions for the single domain name that are, in chronological order, a first add operation, a second add operation, a first delete operation, a second delete operation, and a third add operation. Accordingly, there is at least one add operation (the first add operation) followed by a delete operation (the first delete operation) followed by an add operation (the third add operation) and one instance of the window of events exists in the single domain name.

In 220, the computing device can search for one or more instances of the window of events using the data set. In some embodiments, the computing device can separate the data set into records for each domain name, while, in further embodiments, the data set may already be separated into records. In such embodiments, each record can include all the operations associated with the domain name for that record. The computing device can search for one or more instances of the window of events in each record, and can identify which domain names include the instances of the window of events and how many instances are included.

In 230, the computing device can determine domain names that have switched name servers. The identified one or more instances of the window in 220 can further be analyzed to determine if a new name server is added in the operations where the instance of the window was identified. If a new name server is added in the second set of one or more add operations that were not present in the first set of one or more add operations, then a name server switching occurred. Using the example presented above, if a new name server is added in the third add operation that is different from the name servers added in the first two add operations then a name server switching occurred. In other words, a name server was added, a name server was deleted, and then a new name server added. In some embodiments, domain names where at least one instance of the window was identified may be flagged as name server switching domain names based on the above analysis.

Additionally, for domain names where multiple instances of the window are identified, a set of name servers in an instance of the window (NSw) can be compared to a set of name servers in a previous instance of the window (NSw'). A transition can be defined as the set-theoretic difference (i.e., the set of elements in one set that are not in the other set) of NSw and NSw'. A name server switching can be determined to occur when the transition set is non-empty (i.e., NSw\NSw'≠∅).

Accordingly, by ignoring individual successive additions and deletions of name servers, and instead focusing on aggregate changes, significant changes in the state of a domain name's name server services can be captured.

Figure 3:
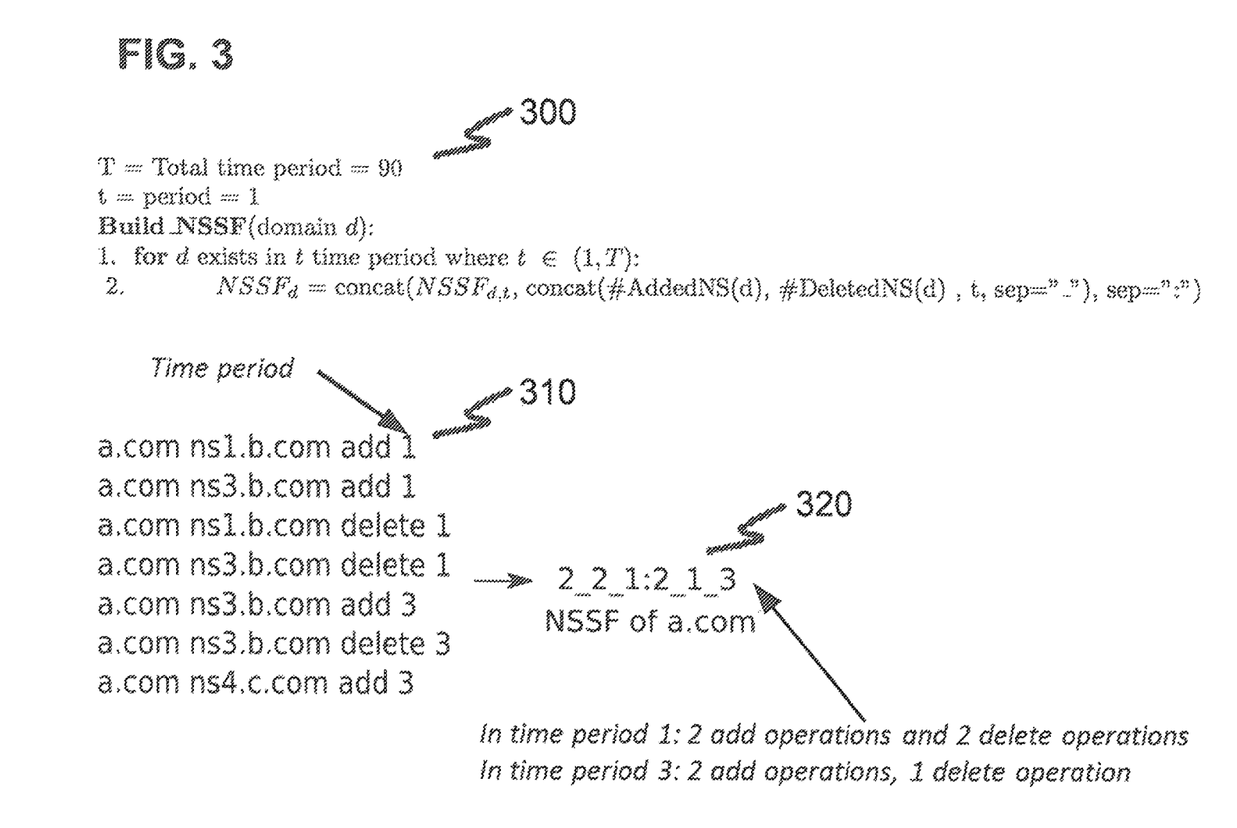
FIG. 3 depicts exemplary pseudo code for building a name server switching footprint, an example data set of a domain name, and an example name server switching footprint, consistent with certain disclosed embodiments.

In 240, the computing device can determine a name server switching footprint ("NSSF") for each domain name indicated as a name server switching domain name. The NSSF can be a domain name's unique identifier for characterizing the pattern of name server switching over time. Example pseudo code for building an NSSF for a domain is shown in FIG. 3. Uses of an NSSF are also described in detail below with regard to FIG. 4A, FIG. 4B, and FIG. 5.

While the steps depicted in FIG. 2 have been described as performed in a particular order, the order described is merely example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

FIG. 3 depicts exemplary pseudo code for building a name server switching footprint, an example data set of a domain name, and an example name server switching footprint, consistent with certain disclosed embodiments.

Pseudo code 300 depicts an informal high-level example of operational steps that can be performed by a computing device to build an NSSF. The pseudo code 300 shows a Build NSSF method that accepts a domain data (d) as input. The domain data can include name server operations from the DNZA file associated with a specified domain name. The pseudo code 300 also establishes a Total time period of 90 days. Accordingly, only operations that fall within the Total time period of 90 days will be considered. In this case, the operations include a time stamp between 1 and 90 (indicating the $1^{st}$ day and the $90^{th}$ day). In further embodiments, different time periods and time units may be used.

The Build NSSF method will generate the NSSF by concatenating a previous NSSF with a current NSSF. Each NSSF will include a number of added name servers and a number of deleted name servers separated by an underscore ("_"). The previous NSSF and the current NSSF will be separated by a colon (":").

For example, the operational steps depicted in the pseudo code 300 can be performed on a data set 310. The data set 310 can represent data corresponding to a domain name, a.com, and can be taken from a DNZA file. The data set 310 can indicate the following chain of events: name server 1 (ns1.b.com) was added to an authoritative list of name servers for a.com on day 1; name server 3 (ns3.b.com) was added to the authoritative list of name servers for a.com on day 1; name server 1 was deleted from the authoritative list of name servers for a.com on day 1; name server 3 was deleted from the authoritative list of name servers for a.com on day 1; name server 3 (ns3.c.com) was added to the authoritative list of name servers for a.com on day 3; name server 3 was deleted from the authoritative list of name servers for a.com on day 3; and name server 4 (4.c.com) was added to the authoritative list of name servers for a.com on day 3.

Performing the operational steps depicted in the pseudo code 300 on the data set 310 can result in an NSSF 320 for a.com. The NSSF 320 for a.com can be the number of adds (2) followed by the number of deletes (2) for day 1, and then the number of adds (2) followed by the number of deletes (1) on day 3. The NSSF 320 for a.com can be a.com's unique identifier for characterizing the pattern of name servers switching over time. The NSSF 320 can be used to identify anomalies in domain name usage based on name server interactions.

As name server switching tends to be associated with malicious, objectionable, and/or unsavory behavior, domain names with anomalous name server interactions can be flagged for further review, blacklisted, etc. Additionally, because domain names that have similar intended uses may have similar NSSFs, the NSSF can be used to identify intended usage of the domain name. However, NSSFs of domain names with similar intended usages may not be exact matches, and, accordingly, a process to completely identify the intended usage of flagged domain names by matching similar NSSFs could be labor intensive. In some embodiments, the identification process can be automated by clustering the domain names, as discussed further with regard to FIGS. 4A and 4B.

The pseudo code, data set, and NSSF depicted in FIG. 3 are intended to be simplified examples for the purpose of illustration, and are not intended to be limited. For example, different operational steps, different data set formats, and different NSSF formats may be used, consistent with disclosed embodiments.

Figure 4A:
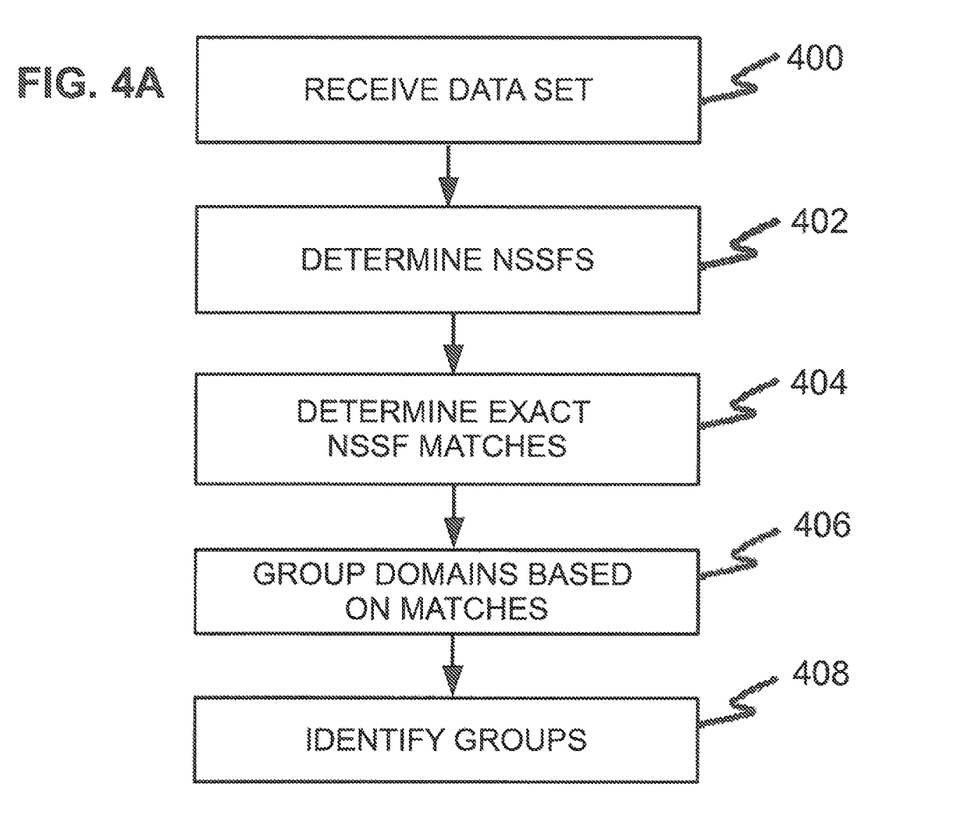
FIG. 4A is a flow diagram illustrating an example method of clustering domain names using exact matches, consistent with certain disclosed embodiments.

FIG. 4A is a flow diagram illustrating an example method of clustering domain names using exact matches, consistent with certain disclosed embodiments. The example method can begin in 400, when a computing device receives a data set related to domain name server operations. The data set can include one or more rapid zone update files, a DNZA file, and/or a data set generated therefrom. In some embodiments, the data set may only include domain names that fit specified criteria. For example, only domain names with at least a threshold number of name server operations may be included in the data set.

In 402, the computing device can determine NSSFs for domain names in the data set. For example, the computing device can determine a NSSF for each domain in the data set or for each domain determined to have switched name servers in the data set. The NSSFs can be determined using, for example, the processes described above with regard to FIG. 2 and/or FIG. 3.

In 404, the NSSFs can be compared to each other, and matches can be identified. In some embodiments, only NSSFs that are exact matches may be identified.

In 406, the domain names with NSSFs that are matches can be grouped together. In some embodiments, every domain name can be put into a group or cluster of one or more domain names. In further embodiments, only domain names that meet specified criteria may be put into groups or clusters. For example, in some embodiments, domain names that have an NSSF of at least a threshold length may be clustered into groups of domains with matching NSSFs and domain names that have an NSSF that is less than the threshold length may not be grouped and/or may not be further analyzed.

In 408, the groups can be identified based on, for example, intended uses of the domain names in the group. In some embodiments, the groups can be identified based on a pre-identification of one or more domain names in the group. The pre-identification of the one or more domain names in the group can be extrapolated to the remaining domain names in the group. In further embodiments, the group can be analyzed as a whole or a sample of domain names from the group can be analyzed manually, and an identification can be created for the group.

For example, a group of domain names may be identified automatically or manually as take over domain names. Take over domain names are domain names that are registrations that have previously expired and re-registered by a different registrant with the intention of attracting traffic based on previous usage of the domain. As an additional example, a group of domain names may be identified automatically or manually as link farm domain names. Link farm domain names are domain names that are registered for the primary purpose of linking to one or more target domain names with the intention of increasing the perceived importance of the one or more target domain names (e.g., increasing the page rank of the target domain names).

The groups can be identified manually or automatically based on, for example, content of webpages associated with the domain, WHOIS information for the domain names, domain name information service information, registry information, prior identifications of the domain names, etc. For example, the computing device can extract registration information (e.g., registrant and registrar) from a WHOIS database for each domain name where the information is available. Additionally, as a further example, the computing device can extract hosting information from a domain name information service such as the Internet Profile Service for Registrars (hereinafter, "IPS") provided by the Verisign® corporation.

While the steps depicted in FIG. 4A have been described as performed in a particular order, the order described is merely example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4B:
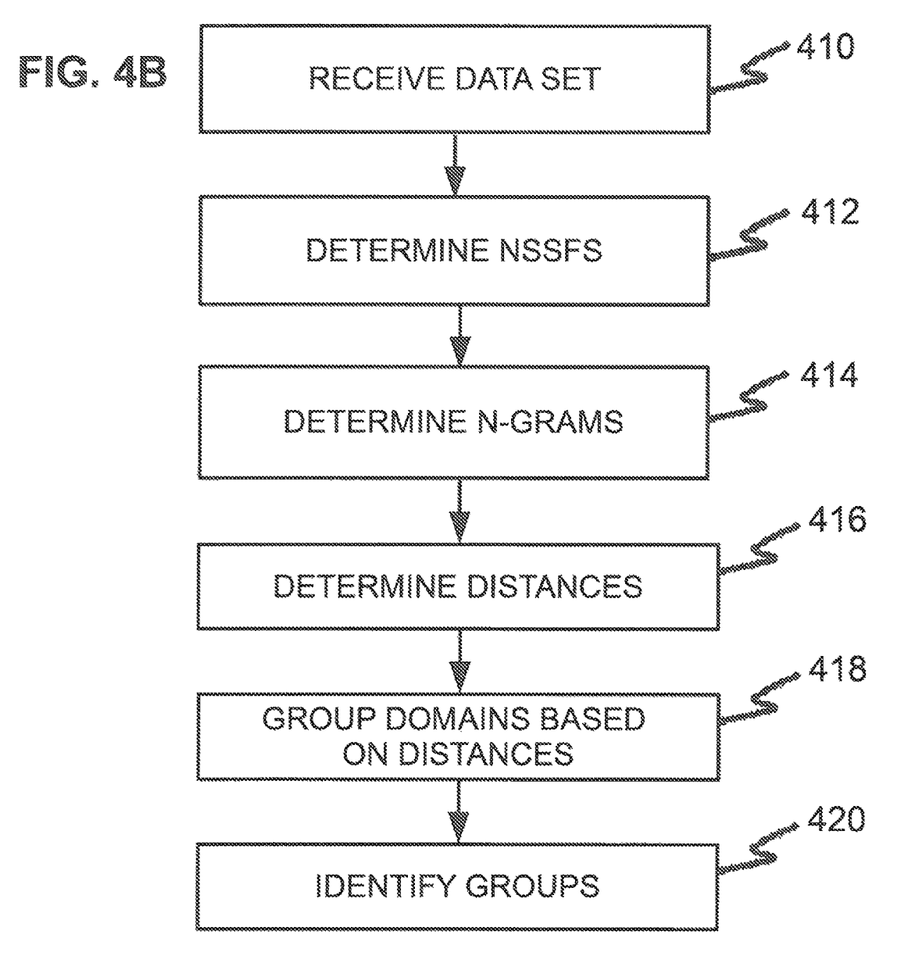
FIG. 4B is a flow diagram illustrating an example method of clustering domain names using n-grams, consistent with certain disclosed embodiments.

FIG. 4B is a flow diagram illustrating an example method of clustering domain names using n-grams, consistent with certain disclosed embodiments. The example method can begin in 410, when a computing device receives a data set related to domain name server operations. The data set can include one or more rapid zone update files, a DNZA file, and/or a data set generated therefrom.

In 412, the computing device can determine NSSFs for domain names in the data set. For example, the computing device can determine a NSSF for each domain in the data set or for each domain determined to have switched name servers in the data set. The NSSFs can be determined using, for example, the processes described above with regard to FIG. 2 and/or FIG. 3.

In 414, the NSSFs can be compared to each other, and n-grams can be identified.

An n-gram can be a string of any length that is included in two or more NSSFs. For example, a first NSSF "2_2_1:1_1_2:3_1_3" and a second NSSF "2_1_1:1_1_2:3_1_3" both include the string "1_1_2:3_1_3", which can represent an n-gram match.

In some embodiments, n-grams can be identified by taking a domain, splitting the NSSF for the domain across time and consider each part of the footprint as an item of a set from which the n-gram is constructed. Accordingly, an NSSF will be split into a set of items, where each item is an n-gram and the set size will be the same as the number of time-stamps. The sets can be compared to sets from other domain names.

As example, a domain a.com may have the footprint "2_0_1:0_2_2:4_3_3" which can be denoted as $NSSF_{a.com}$. The NSSF can indicate that domain a.com adds two name servers at time 1, deletes both the name servers at time 2, and adds four name servers and deletes three name servers at time 3. To build the n-gram, $NSSF_{a.com}$ can be split across time and each part of the NSSF can be considered as an item of a set from which an n-gram is constructed. $NSSF_{a.com}$ spans over three time-stamps, so the split across time will yield a set of three n-grams {"2_0_1", "0_2_2", "4_3_3"}. Each n-gram in the set can be compared to n-grams and/or sets from other domain names.

In the above example, the exemplary NSSF is based on specified time-stamps (e.g., day 1, day 2, and day 3). However, in other embodiments, events in the NSSF can instead be considered ordered events. In other words, a time-stamp used in an NSSF can be a time index in the time series. For example, instead of an NSSF such as 2_2_3:2_1_5, with time-stamps of 3 and 5 that indicate operations on a third day and a fifth day, an NSSF can use an index (e.g., i), such as "2_2_i:2_1_i+2". In some embodiments, the index can be set based on a first name server operation, a first set of operations that fit a pattern, etc. Additionally, time intervals and time-stamps do not have to be presented in terms of days, and other time units may be utilized, consistent with certain disclosed embodiments.

In further embodiments, n-grams can be identified by taking a domain and splitting the NSSF for the domain based on events (e.g., add, delete) and time. Accordingly, an NSSF will be split into a set of items, where each item is an n-gram and the set size will be the same as the number of different events plus one for time. The sets can be compared to sets from other domain names.

As an example, a domain a.com may have the footprint "2_0_1:0_2_2:4_3_3" which can be denoted as $NSSF_{a.com}$.

To build the n-gram, $NSSF_{a.com}$ can be split based on events and time to construct the n-grams. $NSSF_{a.com}$ includes two types of events, add and delete, so the split based on events plus one for time would result in {"2_0_4", "0_2_3", "1_2_3"}. The first n-gram ("2_0_4") represents the number of add operations performed on days 1, 2, and 3, respectively. The second n-gram ("0_2_3") represents the number of delete operations performed on days 1, 2, and 3, respectively. The third n-gram ("1_2_3") represents the time-stamps. Each n-gram in the set can be compared to n-grams and/or sets from other domain names.

In 416, a distance metric and/or measure can be applied to n-grams for pairs of domain names. In some embodiments, a distance measure can be performed on the n-grams of a domain pair and a final distance can be determined. For example, a distance measure can be performed on each pair of n-grams and an average of the distances can be considered the final distance for the pair of domain names. As used herein, a distance can be a numerical value used to represent the difference between at least two sets of data.

In some embodiments, every n-gram for every domain name can be compared to n-grams of every other domain name. In further embodiments, only n-grams of domain names that meet specified criteria and/or only n-grams related to specified events (e.g., add and delete) may be compared.

Examples of distance measures that can be used include, but are not limited to, Tribased Distance and Keselj distance.

In 418, the domain names can be clustered based on the distances. In some embodiments, every domain name can be put into a group or cluster of one or more domain names. In further embodiments, only domain names that meet specified criteria may be put into groups or clusters. For example, in some embodiments, domain names that have an NSSF of at least a threshold length may be clustered into respective groups of domains and domain names that have an NSSF that is less than the threshold length may not be grouped and/or may not be further analyzed.

Various clustering methods know in the art may be used. For example, an agglomerative hierarchical clustering may be used, where each domain starts in its own cluster and clusters are progressively merged based on distance measures with other domain names and/or clusters until an optimal clustering is achieved.

In some embodiments, a threshold distance can be set (e.g., manually), and the threshold distance can represent the maximum distance between two domain pairs that are clustered together.

In 420, the groups can be identified based on, for example, intended uses of the domain names in the group. In some embodiments, the groups can be identified based on a pre-identification of one or more domain names in the group. The pre-identification of the one or more domain names in the group can be extrapolated to the remaining domain names in the group. In further embodiments, the group can be analyzed as a whole or a sample of domain names from the group can be analyzed manually, and an identification can be created for the group.

The groups can be identified manually or automatically based on, for example, content of webpages associated with the domain, WHOIS information for the domain names, domain name information service information, registry information, prior identifications of the domain names, etc.

In some embodiments, all groups may be identified while, in further embodiments, some groups may not be identified.

For example, in some embodiments, only a predetermined number of groups may be identified (e.g., the largest groups).

While the steps depicted in FIG. 4B have been described as performed in a particular order, the order described is merely example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 5:
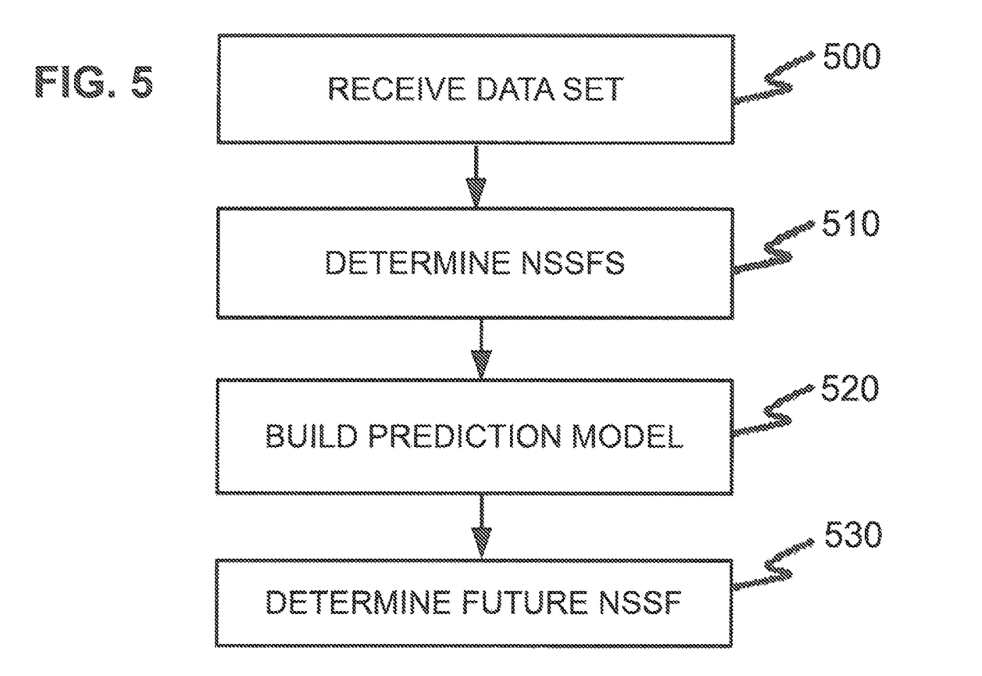
FIG. 5 is a flow diagram illustrating an example method of predicting name server switching footprints, consistent with certain disclosed embodiments.

FIG. 5 is a flow diagram illustrating an example method of predicting name server switching footprints, consistent with certain disclosed embodiments. The example method can begin in 500, when a computing device receives a data set related to domain name server operations. The data set can include one or more rapid zone update files, a DNZA file, and/or a data set generated therefrom.

In 510, the computing device can determine NSSFs for domain names in the data set. For example, the computing device can determine a NSSF for each domain name in the data set or for each domain name determined to have switched name servers in the data set. The NSSFs can be determined using, for example, the processes described above with regard to FIG. 2 and/or FIG. 3.

In 520, the computing device can build a prediction model based on the determined NSSFs. In embodiments, the prediction model can be trained using the determined NSSFs. For example, the prediction model can be an Autoregressive Integrated Moving Averages ("ARIMA") model. The ARIMA model can be defined as $Y_t=(1-L)^d X_t$, where $Y_t$ is the predicted variable, L is the lag operator or backshift (defined as an operator on the time series to produce the previous element), and d is the multiplicity factor.

Using the prediction model, in 530, the computing device can determine a future NSSF for a domain. The name server operations for a domain can be input into the prediction model, and the prediction model can output a predicted value for future operations. In some embodiments, the predicted value can be rounded to a nearest whole number.

As a simplified example, a set of three NSSFs can be {(3_1_i:2_3_i+1:2_2_i+3);(3_1_i:2_3_i+1:2_1_i+3); (3_1_i:2_3_i+1:2_2_i+3)}, where i is an index time-stamp. The set of NSSFs can be used to build a prediction model. Name server operations for a new domain may be input into the prediction model. Name server operations for the new domain may be three add operations and one delete operation on day 5 and two add operations and three delete operations on day 6. If the index value was 5, the NSSF for the new domain could be "3_1_i:2_3_i+1". Using the prediction model, a computing device may predict future operations to be two add operations and 1.67 delete operations on day 8. The predicted delete operations can be rounded to 2.

A prediction model can enable identification of complete NSSFs (within the certainty guarantees of the prediction model) for interactions that have yet to occur. It can also enable the probabilistic identification of intended uses for domain names (e.g., using the predicted NSSF) before the intended uses occur. This can allow proactive or preemptive measures to prevent intended misuse of a domain name. For example, the domain name can be preemptively blacklisted.

While the steps depicted in FIG. 5 have been described as performed in a particular order, the order described is merely example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 6:
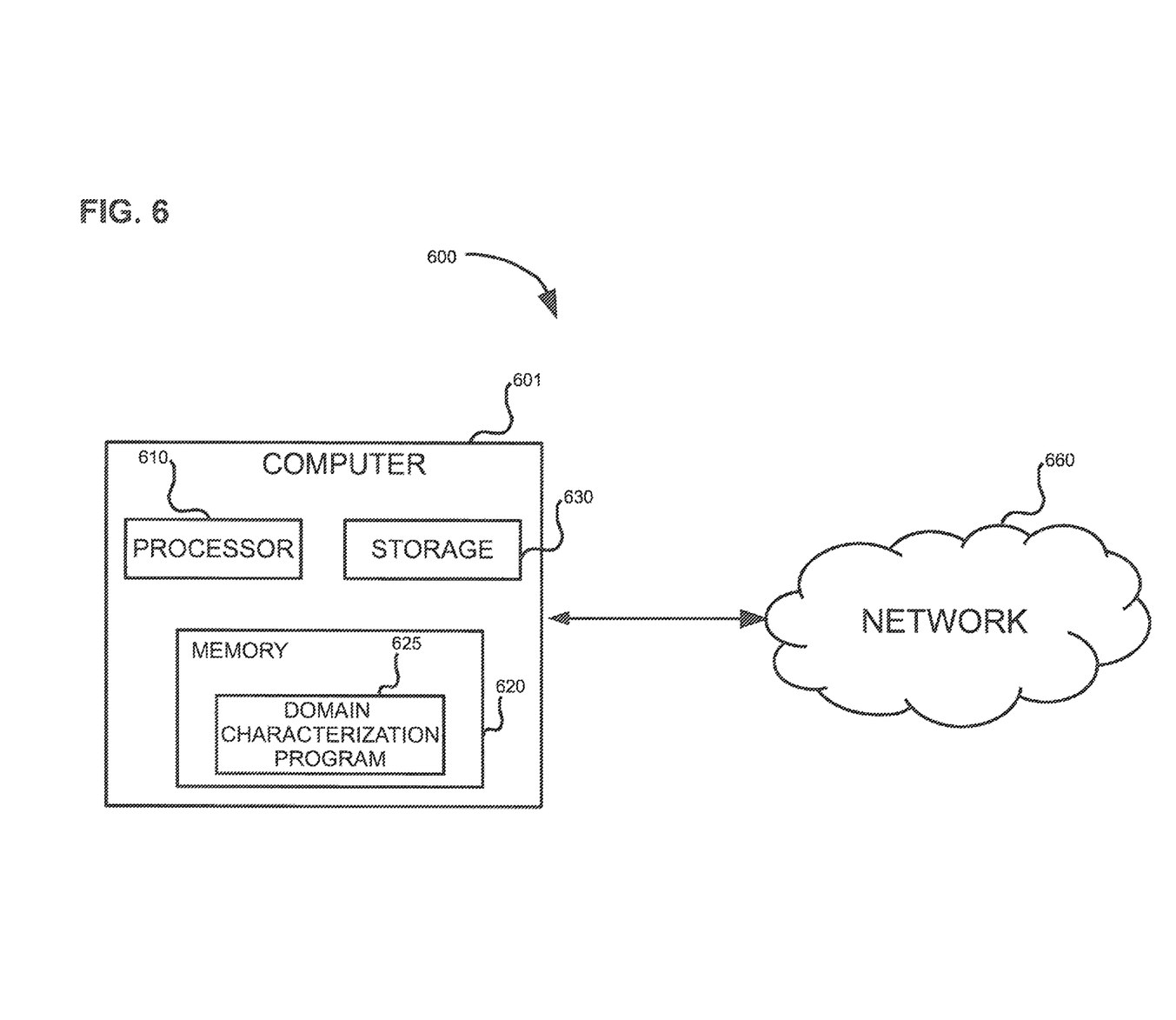
FIG. 6 is a diagram illustrating an example hardware system for characterizing domain names based on changes of name servers, consistent with certain disclosed embodiments.

FIG. 6 is a diagram illustrating an example hardware system for characterizing domain names based on changes of name servers, consistent with certain disclosed embodiments. The example system 600 includes example system components that may be used. The components and arrangement, however, may be varied.

A computer 601 may include a processor 610, a memory 620, storage 630, and input/output (I/O) devices (not pictured). The computer 601 may be implemented in various ways and can be configured to perform any of the embodiments described above. For example, the computer 601 may be a general purpose computer, a mainframe computer, any combination of these components, or any other appropriate computing device. The computer 601 may be standalone, or may be part of a subsystem, which may, in turn, be part of a larger system.

The processor 610 may include one or more known processing devices, such as a microprocessor from the Intel Core™ family manufactured by Intel™, the Phenom™ family manufactured by AMD™, or any of various processors manufactured by Sun Microsystems. Memory 620 may include one or more storage devices configured to store information used by processor 610 to perform certain functions related to disclosed embodiments. Storage 630 may include a volatile or non-volatile, magnetic, semiconductor, tape, optical, removable, non-removable, or other type of computer-readable medium used as a storage device.

In one embodiment, memory 620 may include one or more programs or subprograms that may be loaded from storage 630 or elsewhere that, when executed by computer 601, perform various procedures, operations, or processes consistent with disclosed embodiments. For example, memory 620 may include a domain characterization program 625 for determining NSSFs, clustering domains, and predicting NSSFs according to disclosed embodiments. Memory 620 may also include other programs that perform other functions and processes, such as programs that provide communication support, Internet access, etc. The domain characterization program 625 may be embodied as a single program, or alternatively, may include multiple sub-programs that, when executed, operate together to perform the function of the domain characterization program 625 according to disclosed embodiments.

The computer 601 may communicate over a link with a network 660. For example, the link may be a direct communication link, a LAN, a WAN, or other suitable connection. The network 660 may include the internet, as well as other systems.

The computer 601 may include one or more I/O devices (not pictured) that allow data to be received and/or transmitted by the computer 601. I/O devices may also include one or more digital and/or analog communication input/output devices that allow the computer 601 to communicate with other machines and devices. I/O devices may also include input devices such as a keyboard or a mouse, and may include output devices such as a display or a printer. The computer 601 may receive data from external machines and devices and output data to external machines and devices via I/O devices. The configuration and number of input and/or output devices incorporated in I/O devices may vary as appropriate for various embodiments.

In embodiments, the computer 601 may also be communicatively connected to one or more data repositories.

Example uses of the system 600 can be described by way of example with reference to the example embodiments described above.

While the teachings has been described with reference to the example embodiments thereof, those skilled in the art will be able to make various modifications to the described embodiments without departing from the true spirit and scope. The terms and descriptions used herein are set forth by way of illustration only and are not meant as limitations.

In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method, comprising:
   receiving a data set corresponding to name server operations for a plurality of domain names, wherein each name server operation of the name server operations is associated with a time unit;
   determining, using one or more processors, an identifier for each domain name in the plurality of domain names based on the name server operations, wherein:
      the identifier comprises a Name Server Switching Footprint (NSSF), textual data, and indicates name server switching operations associated with the domain name; and
      the NSSF comprises a string with a first value that represents a number of add operations associated with a number of name servers added to an authoritative list of name servers for the domain name and a second value that represents a number of delete operations associated with a number of name servers deletions to the authoritative list of name servers for the domain name;
   determining the identifier comprising determining the NSSF by building a string for each time unit and concatenating the strings together;
   determining that an NSSF of a first domain name of the plurality of domain names is associated with a malicious domain name use by matching the first value and the second value to corresponding first and second values in an NSSF associated with the malicious domain name use; and
   in response to determining that the NSSF of the first domain name is associated with a malicious domain name use, adding the first domain name to a blacklist to prevent a malicious use of the first domain name.

2. The computer-implemented method of claim 1, further comprising clustering domain names into a plurality of groups based on matching identifiers.

3. The computer-implemented method of claim 1, further comprising:
   determining n-grams of each identifier; and
   determining distances between domain names based on the n-grams.

4. The computer-implemented method of claim 3, further comprising clustering domain names into a plurality of groups based on the distances between domain names.

5. The computer-implemented method of claim 4, further comprising determining a distance threshold, wherein distances between pairs of domain names in a group must not exceed the distance threshold.

6. The computer-implemented method of claim 4, further comprising:
   identifying a category of at least one domain name in a group; and
   extrapolating the category to each remaining domain name in the group.

7. The computer-implemented method of claim 6, further comprising blacklisting each domain name in the group based on a determination that the category of the domain names in the group is malicious.

8. The computer-implemented method of claim 6, wherein the category is identified based on one or more of:
   content of a website associated with the at least one domain name;
   WHOIS information associated with the at least one domain name; or
   domain name information service information associated with the at least one domain name.

9. The computer-implemented method of claim 1, further comprising:
   building a prediction model based on the identifiers;
   receiving a data set corresponding to a new domain name; and
   determining a future identifier of the new domain name using the prediction model.

10. The computer-implemented method of claim 9, further comprising identifying a category of the new domain name based on the future identifier.

11. A system comprising:
    a processing system of a device comprising one or more processors; and
    a memory system comprising one or more computer-readable media, wherein the one or more computer-readable media contain instructions that, when executed by the processing system, cause the processing system to perform operations comprising
       receiving a data set corresponding to name server operations for a plurality of domain names, wherein each name server operation of the name server operations is associated with a time unit;
       determining an identifier for each domain name in the plurality of domain names based on the name server operations, wherein:
          the identifier comprises a Name Server Switching Footprint (NSSF), textual data, and indicates name server switching operations associated with the domain name; and
          the NSSF comprises a string with a first value that represents a number of add operations associated with a number of name servers added to an authoritative list of name servers for the domain name and a second value that represents a number of delete operations associated with a number of name servers deletions to the authoritative list of name servers for the domain name;
       determining the identifier comprising determining the NSSF by building a string for each time unit and concatenating the strings together;
       determining that an NSSF of a first domain name of the plurality of domain names is associated with a malicious domain name use by matching the first value and the second value to corresponding first and second values in an NSSF associated with the malicious domain name use; and in response to determining that the NSSF of the first domain name is associated with a malicious domain name use, adding the first domain name to a blacklist to prevent a malicious use of the first domain name.

12. The system of claim 11, the operations further comprising:

determining n-grams of each identifier; and
determining distances between domain names based on the n-grams.

13. The system of claim 12, the operations further comprising clustering domain names into a plurality of groups based on the distances between domain names.

14. The system of claim 13, the operations further comprising:

identifying a category of at least one domain name in a group; and
extrapolating the category to each remaining domain name in the group.

15. The system of claim 14, the operations further comprising blacklisting each domain name in the group based on a determination that the category of the domain names in the group is malicious.

16. The system of 14, wherein the category is identified based on one or more of:

content of a website associated with the at least one domain name;
WHOIS information associated with the at least one domain name; or
domain name information service information associated with the at least one domain name.

17. The system of claim 11, the operations further comprising:

building a prediction model based on the identifiers;
receiving a data set corresponding to a new domain name; and
determining a future identifier of the new domain name using the prediction model.

18. The system of claim 17, the operations further comprising identifying a category of the new domain name based on the future identifier.

19. A non-transitory computer readable storage medium comprising instructions for causing one or more processors to perform operations comprising:

receiving a data set corresponding to name server operations for a plurality of domain names, wherein each name server operation of the name server operations is associated with a time unit;
determining an identifier for each domain name in the plurality of domain names based on the name server operations, wherein:
the identifier comprises a Name Server Switching Footprint (NSSF), textual data, and indicates name server switching operations associated with the domain name; and
the NSSF comprises a string with a first value that represents a number of add operations associated with a number of name servers added to an authoritative list of name servers for the domain name and a second value that represents a number of delete operations associated with a number of name servers deletions to the authoritative list of name servers for the domain name;
determining the identifier comprising determining the NSSF by building a string for each time unit and concatenating the strings together;
determining that an NSSF of a first domain name of the plurality of domain names is associated with a malicious domain name use by matching the first value and the second value to corresponding first and second values in an NSSF associated with the malicious domain name use; and
in response to determining that the NSSF of the first domain name is associated with a malicious domain name use, adding the first domain name to a blacklist to prevent a malicious use of the first domain name.

* * * * *